United States Patent [19]

Blake, Jr.

[11] Patent Number: 4,507,426

[45] Date of Patent: Mar. 26, 1985

[54] SYNERGISTIC MIXTURE OF POLYURETHANE AND EMULSION POLYMERS USEFUL AS THICKENERS FOR AQUEOUS SYSTEMS

[75] Inventor: Donald M. Blake, Jr., Sanford, Mich.

[73] Assignee: The Dow Chemical Company, Midland, Mich.

[21] Appl. No.: 455,440

[22] Filed: Jan. 3, 1983

[51] Int. Cl.$^3$ .................... C08L 53/00; C08F 8/30
[52] U.S. Cl. .................... 524/505; 524/507; 525/92; 525/123; 525/127
[58] Field of Search ............... 525/123, 127; 524/505

[56] References Cited

U.S. PATENT DOCUMENTS

| | | | |
|---|---|---|---|
| 3,652,497 | 3/1972 | Junas et al. | 524/522 |
| 4,075,411 | 2/1978 | Dickstein | 524/44 |
| 4,079,028 | 3/1978 | Emmons et al. | 528/68 |
| 4,384,096 | 5/1983 | Sonnabend | 526/313 |

*Primary Examiner*—John C. Bleutge
*Assistant Examiner*—A. L. Carrillo
*Attorney, Agent, or Firm*—J. S. Boone

[57] ABSTRACT

A thickening composition is made by blending (a) a liquid emulsion polymer made from (i) an addition polymerizable acid, (ii) an addition polymerizable nonionic vinyl monomer, and (iii) a nonionic vinyl surfactant ester; and (b) a urethane polymer having at least three hydrophobic groups, at least two of which are terminal hydrophobic groups, the hydrophobic groups being linked by hydrophilic groups. The thickening compositions of the invention have an excellent combination of properties including leveling, lack of sagging, and lack of syneresis.

5 Claims, No Drawings

4,507,426

SYNERGISTIC MIXTURE OF POLYURETHANE AND EMULSION POLYMERS USEFUL AS THICKENERS FOR AQUEOUS SYSTEMS

BACKGROUND OF THE INVENTION

This invention relates to polymeric agents useful for thickening aqueous systems including latex paints and other aqueous coating compositions. This invention also relates to mixtures of such thickening agents.

For many years additives have been sought for aqueous systems to increase viscosity and to maintain viscosity at required levels under specified processing conditions and end use situations. For this reason, such additives are commonly called "thickeners". Thickeners are useful in oil well drilling and flooding fluids, fire-fighting foams and fluids, detergents, leather pastes and finishes, adhesives, pharmaceuticals, agricultural formulations, latex paints, printing inks, cosmetics, paper coatings, and emulsions of all kinds. The list of applications and auxiliary properties of thickeners is virtually endless.

Among the many well-known thickeners may be mentioned natural products such as the alginates, casein, gum karaya, locust bean gum and gum tragacanth and modified natural products such as the cellulosics, including methyl cellulose, hydroxyethyl cellulose and hydroxypropylmethyl cellulose. Totally synthetic thickeners are also available such as carboxy vinyl ether copolymers, acrylic polymers and maleic anhydridestyrene copolymers. However, all of the known thickeners have deficiencies.

Cellulose ethers, such as described in Glomski et al., U.S. Pat. No. 3,769,247, are often effectively used as thickeners for latex paints. However, solid, water-soluble polymers derived from cellulose and other natural products are becoming increasingly expensive to produce because of high capital, energy, and waste control costs.

Alkali-soluble latex copolymers have been known for some time. Thus, Hager and Martin, U.S. Pat. Nos. 3,003,987 and 3,070,561 and Miller, U.S. Pat. No. 3,081,198 describe copolymers of acrylic and methacrylic acids and esters which may be thickened by replacing a portion of the hydrogen ions of the copolymer carboxyl groups with ammonium or alkali metal ions. Other types of polymeric thickeners are disclosed by Junas and LaTorre, U.S. Pat. Nos. 3,652,497 and 3,708,445; Zimmerman, U.S. Pat. No. 3,657,175; Chang and McDowell, U.S. Pat. No. 3,891,591; and Gibson, U.S. Pat. No. 4,003,870. All contain various carboxylic acid groups which can be solubilized in water by neutralization with a water-soluble base. However, to date this technology has had limited impact on major markets for water-soluble polymeric thickeners.

More recently, Evani and Corson developed, as described in U.S. Pat. No. 4,008,202 and related patents, a solid styrene-maleic anhydride-vinylbenzyl ether terpolymer soluble at high pH and useful as a thickener for aqueous solutions. In spite of excellent rheology, stability problems and cost have limited its use as a paint thickener. Further improvements in this technology are clearly desirable.

A very recent advance in thickener technology, described by Emmons and Stevens in U.S. Pat. No. 4,079,028, involves the use of low molecular weight polyurethanes which have hydrophobic groups interconnected by hydrophilic polyether groups. While these materials do provide a thickening action, paint formulations made therefrom nonetheless exhibit undesirable sagging. Further, paint formulations made therefrom undergo syneresis (separation of solid and liquid components).

SUMMARY OF THE INVENTION

In one aspect, the invention is a thickening composition comprising (a) a syneresis reducing amount of a liquid emulsion polymer comprising (i) an addition polymerizable acid monomer, (ii) an addition polymerizable nonionic vinyl monomer, and (iii) a nonionic vinyl surfactant ester; and (b) a thickening amount of a urethane polymer having at least three hydrophobic groups, at least two of which are terminal hydrophobic groups, said hydrophobic groups being linked by hydrophilic groups. In another aspect, the invention is an aqueous system thickened by the aforementioned thickener.

The thickeners and thickened systems of the invention have an excellent combination of properties including leveling, lack of sagging and lack of syneresis.

DETAILED DESCRIPTION OF THE INVENTION

I. Urethane Polymer

As a first component, the practice of the invention contemplates the use of urethane polymers having at least three hydrophobic groups at least two of which are terminal (external) hydrophobic groups. Many of the polymers also contain one or more internal hydrophobic groups. The hydrophobic groups together desirably contain a total of at least 20 carbon atoms and desirably are linked through hydrophilic (water-soluble) groups containing polyether segments of at least about 1,500, preferably at least about 3,000, molecular weight each so that the polymers readily solubilize in water, either by self-solubilization or through interaction with a known solubilizing agent such as a water-miscible alcohol or surfactant. The molecular weight of the polyurethanes is desirably of the order of about 10,000 to 200,000.

The urethane polymers are advantageously prepared in nonaqueous media and are preferably the reaction products of at least reactants (a) and (c) of the following reactants:

(a) a water-soluble polyether polyol,
(b) a water-insoluble organic polyisocyanate,
(c) a monofunctional hydrophobic organic compound selected from monofunctional active hydrogen compounds and organic monoisocyanates, and
(d) a polyhydric alcohol or polyhydric alcohol ether.

The products formed include the following:

1. Reaction products of a reactant (a) containing at least three hydroxyl groups and the foregoing organic monoisocyanates;

2. Reaction products of reactant (a), reactant (b) containing two isocyanate groups, and the foregoing active hydrogen containing compounds. Such compounds wherein the ratio of equivalents of (a) to (b) is 0.5:1 to 1:1 are believed to be new per se; all are believed to be useful in certain systems;

3. Reaction products of reactant (a), reactant (b) containing at least three isocyanate groups, and the active hydrogen containing compounds;

4. Reaction products of reactant (a), reactant (b) and the organic monoisocyanates and;

5. Reaction products of reactants (a), (b), (d) and the organic monoisocyanates.

The reactants are normally employed in substantially stoichiometric proportions, that is, the ratio of total equivalents of active hydrogen containing reactants (whether mono- or polyfunctional) to isocyanate reactants is at least 1:1. A slight stoichiometric excess (e.g., about 5–10 percent) of monofunctional active hydrogen containing compound may be used to eliminate any unreacted isocyanate functionality, thus avoiding toxicity from this source. Greater excesses, particularly of capping hydroxyl compound, may be used to increase thickening efficiency. A slight excess of a monoisocyanate is sometimes desirable in cases where such isocyanate is a capping hydrophobe, to ensure capping of all available active hydrogen functionality.

By "monofunctional active hydrogen compound" is meant an organic compound having only one group which is reactive with isocyanate, such group therefore containing an active hydrogen atom, any other functional groups, if present, being substantially unreactive to isocyanate. Such compounds include monohydroxy compounds such as alcohols, alcohol ethers and monoamines, as well as polyfunctional compounds providing the compound is only monofunctional to isocyanates. For example, the primary amines, although difunctional in many reactions, are only monofunctional towards isocyanates, the hydrogen atom in the resulting urea group being relatively unreactive to isocyanate as compared with the hydrogen atom of the amino group or of unhindered alcohols.

Reactant (c) is a "capping" compound, meaning it reacts with (i.e., "caps") the terminal functional groups of the reaction product of reactants (a) and (b).

The polyether polyol reactant (a) is desirably an adduct of an alkylene oxide and a polyhydric alcohol or polyhydric alcohol ether, a hydroxy-terminated prepolymer of such adduct and an organic polyisocyanate, or a mixture of such adducts with such prepolymers.

Reactant (d) may be employed to terminate isocyanate functionality or to link isocyanate-terminated reaction intermediates. Reactant (d) may be a polyhydric alcohol or polhydric alcohol ether of the same type as used to form the adducts of reactant (a). The polyhydric alcohols or alcohol ethers may be aliphatic, cycloaliphatic or aromatic and may be used singly or in mixtures of either type or mixtures of the two types.

The organic polyisocyanates include simple di- and triisocyanates, isocyanate-terminated adducts of such polyhydric alcohols and organic di- or triisocyanates, as well as isocyanate-terminated prepolymers of polyalkylene ether glycols and organic di- or triisocyanates.

The hydrophobic groups of the polyurethanes occur in the residues of reactants (b) and (c) and may also occur in the residue of reactant (d) if present. The terminal (external) hydrophobes are the residues of the monofunctional active hydrogen compounds, organic monoisocyanates, or combinations of the residues of such compounds.

By appropriate selection of reactants and reaction conditions, including proportions and molecular weights of reactants, a variety of polymeric urethane products may be obtained.

Further details concerning the description and manufacture of the urethane polymers useful in the invention may be found in U.S. Pat. No. 4,079,028, which is incorporated herein by reference.

II. Liquid Emulsion Polymer

As a second component, the invention contemplates the use of liquid emulsion polymers made from three essential components: (A) an addition polymerizable acid monomer, (B) a polymerizable nonionic vinyl monomer, and (C) nonionic vinyl surfactant esters. The proportions of the individual monomers can be varied to achieve optimum properties for specific applications.

A. Carboxylic Acid Monomer

The liquid emulsion polymer requires an addition polymerizable acid. Preferably, this is present as about 15–60 weight percent based on total monomers of a $C_3$–$C_8$ $\alpha,\beta$-ethylenically unsaturated carboxylic acid monomer of the formula:

where
R is H and R' is H, $C_1$–$C_4$ alkyl, or —$CH_2COOX$;
R is —COOX and R' is H or —$CH_2COOX$; or
R is $CH_3$ and R' is H; and X is H or $C_1$–$C_4$ alkyl.

Acrylic or methacrylic acid or a mixture thereof with itaconic or fumaric acid are preferred, but crotonic and aconitic acid and half esters of these and other polycarboxylic acids such as maleic acid with $C_1$–$C_4$ alkanols are also suitable, particularly if used in minor amount in combination with acrylic or methacrylic acid. For most purposes, it is preferable to have at least about 25 weight percent and most preferably from about 35–55 weight percent of the carboxylic acid monomer. However, polycarboxylic acid monomers and half esters can be substituted for a portion of the acrylic or methacrylic acid, e.g., about 1–15 weight percent based on total monomers.

B. Nonionic Vinyl Monomer

To provide the extended polymer backbone and body needed for effective thickening requires a polymerizable nonionic vinyl monomer. Preferably, this is present at about 15–80 weight percent of at least one copolymerizable nonionic $C_2$–$C_{12}$ $\alpha,\beta$-ethylenically unsaturated monomer selected from the group consisting of the formula:

$$CH_2=CYZ \qquad (II)$$

where
Y is H and Z is —COOR, —$C_6H_4R'$, CN, Cl,

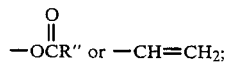

Y is $CH_3$ and Z is —COOR, —$C_6H_4R'$, CN or —CH=$CH_2$; or
Y and Z are Cl; and
R is $C_1$–$C_8$ alkyl or $C_2$–$C_8$ hydroxyalkyl;
R' is H, Cl, Br, or $C_1$–$C_4$ alkyl;
R" is $C_1$–$C_8$ alkyl.

Typical of such monomers are the $C_1$–$C_8$ alkyl and $C_2$–$C_8$ hydroxyalkyl esters of acrylic and methacrylic acid including ethyl acrylate, ethyl methacrylate, methyl methacrylate, 2-ethylhexyl acrylate, butyl acrylate, butyl methacrylate, 2-hydroxyethyl acrylate, 2- hydroxybutyl methacrylate; styrene, vinyltoluene, t-butylstyrene, isopropylstyrene, and p-chlorostyrene; vinyl acetate, vinyl butyrate, vinyl caprolate; acrylonitrile, methacrylonitrile, butadiene, isoprene, vinyl chloride, vinylidene chloride, and the like. In practice, a monovinyl ester such as ethyl acrylate or a mixture thereof with styrene, hydroxyethyl acrylate, acrylonitrile, vinyl chloride or vinyl acetate is preferred.

These monomers, of course, must be copolymerizable with the carboxylic acid and vinyl surfactant ester comonomers. Normally about 15-80 weight percent, and preferably about 20-60 weight percent of nonionic vinyl monomer, based on total weight of monomers, is used in preparing the liquid emulsion polymer.

C. Nonionic Vinyl Surfactant Ester

The third required monomer component is a nonionic vinyl surfactant ester. Preferably, this is present at about 1-30 weight percent based on total monomers of a nonionic vinyl surfactant ester of the formula:

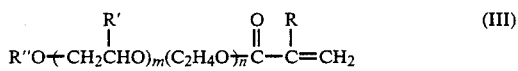  (III)

where
R is H or CH$_3$; each R' is C$_1$-C$_2$ alkyl;
R" is C$_8$-C$_{20}$ alkyl or C$_8$-C$_{16}$ alkylphenyl;
n is an average number from about 6-100 and m is an average number from about 0-50 provided that n≧m and Σ(n+m) is about 6-100.

Preferred are the acrylate and methacrylate surfactant esters selected from the group consisting of:

(1) alkylphenoxypoly(ethyleneoxy)ethyl acrylates of the formula:

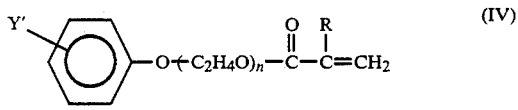  (IV)

where R is H or CH$_3$; Y' is C$_8$-C$_{16}$ alkyl, and n is about 6-100;

(2) alkoxypoly(ethyleneoxy)ethyl acrylates of the formula:

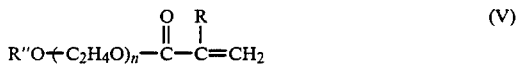  (V)

where R is H or CH$_3$, R" is C$_8$-C$_{20}$ alkyl, and n is about 6-50; and (3) alkoxypoly(alkyleneoxy)ethyl acrylates of the formula:

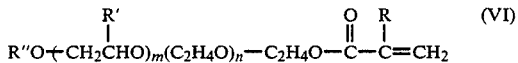  (VI)

where
R is H or CH$_3$, each R' is C$_1$-C$_2$ alkyl,
R" C$_8$-C$_{20}$ alkyl, and
n is about 6-50 and m is about 1-40.

These essential vinyl surfactant esters are the acrylic or methacrylic acid esters of certain nonionic surfactant alcohols. Such surfactant esters are known in the art. For example, Junas et al., U.S. Pat. No. 3,652,497 describe the use of alkylphenoxyethyleneoxyethyl acrylates in preparing several other polymeric surfactant thickeners. Dickstein, U.S. Pat. No. 4,075,411 describes several processes for preparing such vinyl surfactant esters including the acid catalyzed condensation of commercially available nonionic polyoxyalkylene surfactant alcohols such as alkylphenoxypoly(ethyleneoxy) ethyl alcohol and blockpolymeric glycols with acrylic, methacrylic, crotonic, maleic, fumaric, itaconic or aconitic acid. Alternate esterification methods including alcoholysis and transesterification are also described. Other suitable vinyl surfactant esters can be prepared from monoethers of mixed or heteric ethyleneoxy-propyleneoxy-butyleneoxy polyglycols such as described in Patton, U.S. Pat. No. 2,786,080. Additional surfactant alcohols which can be esterified for use herein are given in "McCutcheon's Detergents and Emulsifiers" 1973, North American Edition, Allured Publishing Corp., Ridgewood, N.J. 07450.

Certain of these vinyl surfactant esters, i.e., those defined by Formula III and particularly the alkylphenoxy and alkoxyethyl esters of Formulas IV-VI, are useful in preparing the novel emulsion polymers described herein. It is essential that the surfactant be incorporated in the liquid emulsion product by copolymerization. Advantageously the requisite surfactant esters are prepared by the direct acid catalyzed esterification of the appropriate surfactant alcohol with an excess of the carboxylic acid monomer used as Component A. The resulting mixture with excess acid can be used directly in the copolymerization provided that at least 30 percent, and preferably 50-70 percent or more, of the surfactant alcohol in the mixture is esterified. The vinyl surfactant ester can also be recovered, purified by conventional means using an appropriate inhibitor such as hydroquinone or p-tertbutylcatechol to prevent undesired homopolymerization, and then used to prepare the liquid emulsion polymers.

It has been found that the hydrophilic lipophilic balance (HLB) of the vinyl surfactant ester is an important factor in the performance of the resulting emulsion polymer. Thus for a given polyethyleneoxy content, increasing the chain length of the terminal hydrophobic alkoxy or alkylphenoxy group will increase the efficiency of the resulting polymer as a thickener. Also for a given lipophilic group decreasing the number of polyethyleneoxy groups increases thickener efficiency. For many surfactant esters usable herein an average of about 10-40 ethyleneoxy groups (e.g., Formula III, n=10-40) is preferred.

Also it has been found that the hydrophilic balance of the copolymer product can be adjusted to a degree by the judicious selection of the nonionic vinyl monomer B; e.g., a soft, (lower alkyl)poly(ethyleneoxy)ethyl ester of Formula VI can be used in a system with mixture of ethyl acrylate and a hard comonomer such as styrene. However, it is critical to the performance of these products that they contain an effective amount of an in situ, bound surfactant to control the rheology of the aqueous system thickened with the solubilized emulsion polymer.

The novel liquid emulsion copolymers are conveniently prepared from the above-described monomers by conventional emulsion polymerization at an acid pH lower than about 5.0 using free-radical producing initiators, usually in an amount from 0.01 percent to 3 percent based on the weight of the monomers. The free-radical producing initiators conveniently are peroxygen compounds especially inorganic persulfate compounds such as ammonium persulfate, potassium persulfate, sodium persulfate; peroxides such as hydrogen peroxide; organic hydroperoxides, for example, cumene hydroperoxide, t-butyl hydroperoxide; organic peroxides, for example, benzoyl peroxide, acetyl peroxide, lauroyl peroxide, peracetic acid, and perbenzoic acid (sometimes activated by a water-soluble reducing agent such as ferrous compound or sodium bisulfite); as well as other free-radical producing materials such as 2,2'-azobisisobutyronitrile.

Optionally, a chain transfer agent and an additional emulsifier can be used. Representative chain transfer agents are carbon tetrachloride, bromoform, bromotrichloromethane, long chain alkyl mercaptans and thioesters such as n-dodecyl mercaptan, t-dodecyl mercaptan, octyl mercaptan, tetradecyl mercaptan, hexadecyl mercaptan, butyl thioglycolate, isooctyl thioglycolate, and dodecyl thioglycolate. The chain transfer agents are used in amounts up to about 10 parts per 100 parts of polymerizable monomers.

Often at least one anionic emulsifier is included in the polymerization charge and one or more of the known nonionic emulsifiers may also be present. Examples of anionic emulsifiers are the alkali metal alkyl aryl sulfonates, the alkali metal alkyl sulfates and the sulfonated alkyl esters. Specific examples of these well-known emulsifiers are sodium dodecylbenzenesulfonate, sodium disecondary-butylnaphthalene sulfonate, sodium lauryl sulfate, disodium dodecyldiphenyl ether disulfonate, disodium n-octadecylsulfosuccinamate and sodium dioctylsulfosuccinate.

Optionally, other ingredients well known in the emulsion polymerization art may be included such as chelating agents, buffering agents, inorganic salts and pH adjusting agents.

Polymerization at an acid pH lower than about 5.0 permits direct preparation of an aqueous colloidal dispersion with relatively high solids content without problems of undue viscosity.

Usually the copolymerization is carried out at a temperature between about 60° C. and 90° C. but higher or lower temperatures may be used. The polymerization is carried out batchwise, stepwise or continuously with batch and/or continuous addition of the monomers in a conventional manner.

The essential monomers can be copolymerized in such proportions, and the resulting emulsion polymers can be physically blended, to give products with the desired balance of properties for specific applications. For example, if a more viscous product is desired, the acid and surfactant monomer content can be increased. Greater flexibility and coalescence can be obtained with higher amounts of ethyl acrylate. Addition of styrene as a second nonionic vinyl monomer will increase to a higher pH the adjustment required to dissolve the emulsion in an aqueous coating composition. Minor quantities of a polyfunctional monomer, such as itaconic or fumaric acid or isoprene to introduce a higher carboxylic acid content or limited crosslinking, provides further control on the solubility of the emulsion polymer after pH adjustment. Thus, by varying the monomers and their proportions, emulsion polymers having optimum properties for particular applications can be designed.

In practice it is normally desirable to copolymerize about 15–60 weight percent based on total monomers (more desirably from about 25–60 weight percent, preferably about 35–55 percent, and most preferably about 40–50 percent) of the carboxylic acid monomer A, about 15–80 weight percent (preferably about 20–60 percent, and most preferably about 35–50 percent), of the nonionic vinyl monomer B and about 1–30 weight percent (preferably about 2–20 percent, and most preferably about 2–12 percent) of the nonionic vinyl surfactant ester C. Particularly effective liquid emulsion polymer thickeners are obtained by copolymerization of about 40–50 weight percent of methacrylic acid, about 35–50 weight percent of ethyl acrylate, and about 2–12 weight percent of the methacrylic ester of a $C_9$-alkylphenoxy(ethyleneoxy)$_9$ ethyl alcohol.

Further teachings of emulsion polymers useful in the invention, and a method of preparation, may be found in U.S. patent application Ser. No. 219,480, filed 1980.12.23.

II. Thickening System

The urethane polymer and emulsion polymer are combined for use in an aqueous system. Aqueous systems in which the polymer mixtures of the invention are useful include aqueous coating compositions for paper, leather and textiles, latex paints, oil well flooding compositions and drilling muds, detergents, adhesives, waxes, polishes, cosmetics and toiletries, topical pharmaceuticals, and pesticidal and agricultural compositions. Further, these polymer systems are useful for the thickening of water alone, the resulting mixture then being useful for addition to another system to be thickened.

The polymer mixtures of the invention are very useful for thickening synthetic latexes. Synthetic latexes which may be thickened with the liquid emulsion polymers are aqueous colloidal dispersions of water-insoluble polymers prepared by emulsion polymerization of one or more ethylenically unsaturated monomers. Typical of such synthetic latexes are emulsion copolymers of monoethylenically unsaturated compounds such as styrene, methyl methacrylate, acrylonitrile with a conjugated diolefin such as butadiene or isoprene; copolymers of styrene, acrylic and methacrylic esters, copolymers of vinyl halide, vinylidene halide, vinyl acetate and the like. Many other ethylenically unsaturated monomers or mixtures thereof can be emulsion polymerized to form synthetic latexes. Representative monomers are vinyl aromatic monomers such as styrene, α-methylstyrene, t-butylstyrene, chlorostyrene, vinyltoluene; conjugated dienes such as butadiene, isoprene, and 2-chloro-1,3-butadiene; vinyl chloride, vinylidene chloride, acrylonitrile, and methacrylonitrile; acrylic and β-hydroxyalkyl acrylic esters; vinyl acetate, vinyl propionate, ethylene and methyl isopropenyl ketone. Also limited amounts of unsaturated carboxylic acid monomers such as defined by Formula I are frequently used in preparing the base polymer for latex paints.

The artificial latexes are latexes which are produced by the dispersion or redispersion of pre-formed water-insoluble polymers or solutions thereof. The artificial latexes are produced by known emulsification processes, e.g., by addition of water with stirring until phase inversion occurs, by high shear mixing with water at elevated temperatures or by dilution of a mixture of water and a water-miscible solvent followed by stripping to remove the solvent. A surfactant is required in the emulsification process unless hydrophilic groups are attached to the polymer in sufficient quantity to assist dispersion but in insufficient quantity to produce water-solubility.

Such artificial latexes are produced from polymers which are not prepared readily from monomers by emulsion polymerization, either because no substantial polymerization at a commercially acceptable rate is obtained under usual emulsion polymerization conditions, such as with isobutene, or because a particular form of the polymerized monomer is desired, for example, stereospecific polyisoprene, stereospecific polybutadiene and the like. Representative pre-formed polymers are polymers and copolymers of the mono-olefins having from 2 to 20 carbon atoms such as ethylene, propylene, 1-butene, 2-butene, isobutene, pentene, hexene, octene, dodecene, hexadecene, octadecene and especially those mono-olefins having up to 8 carbon atoms. Especially common types are the various ethylene/propylene copolymers.

Illustrative of still other polymers which can be converted to artificial latexes are alkyd resins, block and graft copolymers; e.g., styrene/butadiene graft and block copolymers; epoxy resins such as the reaction products of epichlorohydrin and bisphenol-A; and thermosettable vinyl ester resins; e.g., the reaction products of approximately equivalent amounts of a polyepoxide and an unsaturated monocarboxylic acid such as acrylic acid and methacrylic acid or unsaturated fatty acids such as oleic acid.

The thickeners of the invention are particularly advantageous for use in latex coating compositions, especially such coating compositions useful as "paints." Usually these latex coating compositions contain added pigments, fillers and extender such as titanium dioxide, barium sulfate, calcium carbonate, clays, mica, talc, silica and the like.

The urethane polymer and emulsion polymer are desirably combined in proportions such that, when added to a paint formulation, the paint exhibits less syneresis than if an equivalent amount of the urethane polymer were used alone, and greater leveling than if an equivalent amount of the emulsion polymer were used alone. Generally, the urethane and emulsion polymers will be combined in a ratio of desirably about 35 to 1, preferably about 3 to 1, and most preferably from about 1.6 to 1 weight parts solids.

The combined polymers are added to an aqueous system in an amount sufficient to increase the viscosity of that system. Generally, when paint formulations are being thickened, the combined polymers are added at desirably about 0.25 to about 9, preferably about 2 to about 6, and most preferably about 3 to about 5, pounds of combined polymers solids per one hundred gallons paint formulation.

The invention will be further illustrated in the following examples. In the examples, all parts and percentages are by weight unless otherwise specified.

EXAMPLE 1

A paint formulation is prepared as follows: to an open container are added 40.80 g water, 0.35 g potassium tripolyphosphate, 1.30 g Nopcosperse 44 wetting agent (available from Diamond Shamrock, Baltimore, Md., U.S.A.), 5.50 g ethylene glycol, 4.70 g DALPAD A ® coalescing agent (available from The Dow Chemical Company, Midland, Mich., U.S.A.), and 0.48 g Nopco NDW suspension agent, (available from Diamond Shamrock, Baltimore, Md., U.S.A.). This mixture is rapidly stirred for 5 minutes, and then 68.7 g Ti pure R901 titanium dioxide (available from E. I. du Pont de Nemours & Co., Wilmington, Del., U.S.A.), 20.8 g Iceberg anhydrous aluminum silicate (available from Burgess, Freeport, Ill., U.S.A.), and 16.3 g Gold Bond R silica (available from Tammsco, Tamms, Ill., U.S.A.), are added. The mixture is stirred under high shear conditions for an additional 20 minutes. Then 88.35 g Amsco Res 3077 acrylic latex (available from Union Oil Co., Los Angeles, Calif., U.S.A.), 0.23 g Nopco NDW, 0.23 g Super Ad It bactericide (available from Tenneco Chemicals, Pensacola, Fla., U.S.A.), 1.00 g DOWFAX ® 2A1 surfactant (available from The Dow Chemical Co., Midland, Mich., U.S.A.), 0.40 g ammonium hydroxide, 1.07 g of an emulsion polymer (prepared by the method of Example 2, run LEP-2A, except that VSE-2B was used rather than VSE-1A, of U.S. patent application Ser. No. 219,480 filed 1980.12.23), 5.14 g QR708 (urethane polymer, believed to be prepared according to the method taught by U.S. Pat. No. 4,079,028 and believed to have a basic chemical structure of $(C_2H_4O)-C-N-R-N-C(OC_2H_4)_n$ in which R is octane or octene), and sufficient water to bring the combined weight of the emulsion polymer, urethane polymer, and water to 41.6 g. This mixture is once again stirred at shear for 20 minutes. The paint formulation is then aged for 14 days at 120°–140° F. to determine its stormer viscosity, ICI viscosity, pH, leneta anti-sag measurement, leneta leveling measurement, and the occurrence of syneresis. The results are reported in Table I.

The above-described procedure is repeated using various thickening agents alone, and in combination with other thickening agents. The results of these evaluations are reported in Table I.

TABLE I

| | Paint Formulation | | | | | |
|---|---|---|---|---|---|---|
| Sample Thickener | 1-1 emulsion/ urethane | 1-2 emulsion/ urethane | 1-3 emulsion/ urethane | 1-4 urethane | 1-5 urethane | 1-6 urethane/ methylcellulose |
| Thickener Loading (lbs/100 gal) | 0.8/7.2 | 2.0/6.0 | 3.0/4.5 | 8.0 | 8.5 | 7.2/0.8 |
| Stormer Viscosity (Kreb units) | 90 | 96 | 95 | 88 | 96 | 91 |
| ICI Viscosity at 10,000 $Sec^1$ (poise) | 2.65 | 2.75 | 2.35 | 2.88 | 3.65 | 2.63 |
| Paint pH | 8.5 | 8.2 | 8.6 | 9.0 | 8.2 | 9.2 |
| Leneta Antisag (3 → 12 = Best) | 9 | 11 | 12 | 8 | 8 | 7 |
| Leneta Leveling (0 → 10 = Best) | 9 | 6 | 4 | 10 | 10 | 9 |

TABLE I-continued

| | Paint Formulation | | | | | |
|---|---|---|---|---|---|---|
| Shelf Age Syneresis | No | No | No | Yes | Yes | No |
| Sample Thickener | 1-7 urethane/ methylcellulose | 1-8 urethane/ natrosol | 1-9 urethane/ natrosol | 1-10 methylcellulose | 1-11 natrosol | |
| Thickener Loading (lbs/100 gal) | 4.5/3.0 | 7.2/0.8 | 4.5/3.0 | 4.0 | 4.5 | |
| Stormer Viscosity (Kreb units) | 94 | 86 | 93 | 91 | 94 | |
| ICI Viscosity at 10,000 Sec$^1$ (poise) | 2.35 | 2.5 | 2.05 | 1.42 | 1.55 | |
| Paint pH | 9.0 | 8.9 | 9.0 | 8.1 | 8.1 | |
| Leneta Antisag (3 → 12 = Best) | 10 | 7 | 10 | 11 | 12 | |
| Leneta Leveling (0 → 10 = Best) | 8 | 9 | 9 | 3 | 3 | |
| Shelf Age Syneresis | Yes | slight | Yes | Yes | No | |

Sample Nos. 1-4 through 1-11 are Comparative Examples and are not examples of the invention;
Natrosol is hydroxyethylcellulose.

What is claimed is:

1. A thickening composition comprising
(a) a syneresis reducing amount of a liquid emulsion polymer comprising the copolymerization product of
  (i) about 15 to about 60 weight percent of an addition polymerizable acid monomer which is represented by the formula:

$$\overset{R'}{\underset{|}{RCH=C-COOH}} \qquad (I)$$

where
R is H and R' is H, $C_1$-$C_4$ alkyl, or —$CH_2COOX$;
R is —COOX and R' is H or —$CH_2COOX$; or
R is $CH_3$ and R' is H; and X is H or $C_1$-$C_4$ alkyl, (ii) about 15 to about 80 weight percent of an addition polymerizable nonionic vinyl monomer which is represented by the formula:

$$CH_2=CYZ \qquad (II)$$

where
Y is H and Z is —COOR, —$C_6H_4R'$, CN, Cl, $$-\overset{O}{\underset{||}{O}}CR'' \text{ or } -CH=CH_2;$$

Y is $CH_3$ and Z is —COOR, —$C_6H_4R'$, CN or —CH=$CH_2$; or
Y and Z are Cl; and
R is $C_1$-$C_8$ alkyl or $C_2$-$C_8$ hydroxyalkyl;
R' is H, Cl, Br, or $C_1$-$C_4$ alkyl;
R'' is $C_1$-$C_8$ alkyl, and (iii) about 1 to about 30 weight percent of a nonionic vinyl surfactant ester which is represented by the formula:

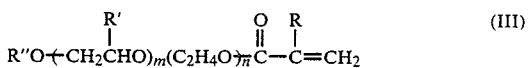

where
R is H or $CH_3$; each R' is $C_1$-$C_2$ alkyl;
R'' is $C_8$-$C_{20}$ alkyl or $C_8$-$C_{16}$ alkylphenyl;
n is an average number from about 6-100 and m is an average number from about 0-50 provided that $n \geq m$ and $\Sigma(n+m)$ is about 6-100; and (b) a thickening amount of a urethane polymer having at least three hydrophobic groups, at least two of which are terminal hydrophobic groups, said hydrophobic groups being linked by hydrophilic groups.

2. The composition of claim 1 wherein, in the urethane polymer, the hydrophobic groups contain at least about 20 carbon atoms and they are linked together by water-soluble polyether segments each having a molecular weight of at least about 1,500.

3. The composition of claim 1 wherein the liquid emulsion polymer is present at about 40 to about 3 parts by weight of solids and urethane polymer is present at about 60 to about 97 parts by weight of solids.

4. A thickened system comprising an aqueous composition to which the thickener of claim 1 has been added.

5. The composition of claim 1 wherein said liquid emulsion polymer comprises the copolymerization product of
  (i) about 25 to about 60 weight percent of said addition polymerizable acid monomer,
  (ii) about 20 to about 60 weight percent of said addition polymerizable nonionic vinyl monomer, and
  (iii) about 2 to about 20 weight percent of said nonionic vinyl surfactant ester.

* * * * *